(12) United States Patent
Kim et al.

(10) Patent No.: US 9,398,660 B2
(45) Date of Patent: Jul. 19, 2016

(54) LIGHTING SYSTEM AND CONTROL CIRCUIT FOR THE SAME

(71) Applicant: SILICON WORKS CO., LTD., Daejeon-si (KR)

(72) Inventors: Yong Geun Kim, Suwon-si (KR); Gyeong Sik Mun, Daejeon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 0 days.

(21) Appl. No.: 14/623,790

(22) Filed: Feb. 17, 2015

(65) Prior Publication Data

US 2015/0237699 A1 Aug. 20, 2015

(30) Foreign Application Priority Data

Feb. 19, 2014 (KR) ........................ 10-2014-0019293

(51) Int. Cl.
*H05B 33/08* (2006.01)

(52) U.S. Cl.
CPC .......... *H05B 33/0845* (2013.01); *H05B 33/083* (2013.01); *H05B 33/0815* (2013.01); *H05B 33/0824* (2013.01); *Y02B 20/347* (2013.01)

(58) Field of Classification Search
CPC ............... H05B 33/0815; H05B 37/02; H05B 33/0851; H05B 33/0818; H05B 41/38; H05B 33/0845; H05B 33/083
See application file for complete search history.

(56) References Cited

U.S. PATENT DOCUMENTS

| 8,508,140 | B2 | 8/2013 | Leung et al. | |
| 2011/0273103 | A1 | 11/2011 | Hong | |
| 2012/0026761 | A1* | 2/2012 | Young ................... | H02M 7/125 363/44 |
| 2014/0333228 | A1* | 11/2014 | Angeles ............. | H05B 33/0815 315/291 |

FOREIGN PATENT DOCUMENTS

| JP | 2011-108645 | 6/2011 |
| JP | 2013-12452 | 1/2013 |
| JP | 2013-98114 | 5/2013 |
| KR | 10-2010-0100623 | 9/2010 |
| KR | 10-1293584 | 8/2013 |
| KR | 10-1415345 | 7/2014 |

* cited by examiner

*Primary Examiner* — Jany Richardson
(74) *Attorney, Agent, or Firm* — Kile Park Reed & Houtteman PLLC

(57) ABSTRACT

Disclosed herein are a lighting system for emitting light using power having a phase controlled by a dimmer and improving the light emission state of a light source and a control circuit for the same. Shimmer can be improved by performing charging and discharging using a current supplied to a load or a current flowing in the current path of a load and performing current control using a charging voltage generated by the charging and discharging.

13 Claims, 16 Drawing Sheets

AC VOLTAGE

LIGHTING SYSTEM AND CONTROL CIRCUIT FOR THE SAME

BACKGROUND

1. Technical Field

The present disclosure relates to a lighting system, and more particularly, to a lighting system for emitting light using power having a phase controlled by a dimmer and improving the light emission state of a light source and a control circuit for the same.

2. Related Art

A lighting system has been developed to use a light source having high emission efficiency using a small amount of energy in order to reduce energy. A representative light source used in the lighting system may be a light-emitting diode (LED).

The LED is advantageous in that it is different from other light sources in various factors, such as energy consumption, life span, and light quality. The LED is characterized in that it is driven by a current. Accordingly, a lighting system using LEDs as a light source is problematic in that it requires many additional circuits for current driving.

In order to solve the problem, a lighting system has been developed to supply AC power to LEDs in an AC direct type. The lighting system of the AC direct type is configured so that the LEDs emit light by converting the AC power into a rectified voltage and performing current driving using the rectified voltage. The lighting system of the AC direct type is characterized in that it has an excellent power factor because it uses the rectified voltage without using an inductor and a capacitor. The rectified voltage refers to a voltage obtained by performing full wave rectification on the AC voltage through the full wave rectification of a rectifier.

Furthermore, the lighting system may include a power circuit for supplying a rectified voltage using an AC power source and a power control unit for performing current control for driving a light source in response to the rectified voltage. In general, the power control unit may be fabricated in a single chip type and mounted on the lighting system.

In the lighting system, the power circuit may be configured to have a dimming function. The dimming function may be implemented by a dimmer adopted in the power circuit. The dimmer is configured to determine the location where the phase of an AC voltage is triggered in response to a change of an internal charging voltage. That is, the dimmer may output an AC voltage having a phase controlled, and a light source emits light with luminosity corresponding to the phase-controlled AC voltage.

The dimmer may control the luminosity of the lighting system from a turn-off level of the light source to a maximum light-emission level depending on performance of the lighting system. If the dimmer has a hysteresis characteristic, it may have power supply efficiency of 20~80%. If the dimmer does not have a hysteresis characteristic, it may have power supply efficiency of 5~95%.

In general, the dimmer is problematic in that compatibility is low depending on a load due to a difference in the characteristics of an internal diac or triac. From a viewpoint of the dimmer, a power control unit for performing current control for driving a light source may serve as a load.

If a load having a resistance characteristic is applied, the dimmer may have excellent characteristics. An example of a load having a resistance characteristic may include an incandescent, which may be defined as a linear load.

The dimmer has limited compatibility in accordance with a load, such as a power control unit having reactance or a power control unit for performing current regulation corresponding to the AC direct type. An example of the load having reactance may include a Flyback or Buck type power control unit. As described above, the power control unit having reactance or the power control unit for performing current regulation corresponding to the AC direct type may be defined as a nonlinear load.

The dimmer is limited in providing AC waveforms of high quality in accordance with the nonlinear load. More specifically, the dimmer may provide an output voltage that has been irregularly delayed due to an RC characteristic. Furthermore, the dimmer may provide an output voltage having a varying width in which turn-on is maintained by the operating characteristics of a triac (i.e., a turn-on width). In particular, a positive output voltage and a negative output voltage may have different turn-on widths. Furthermore, the dimmer may provide an output voltage so that positive output and negative output have different sizes (or amplitudes).

Accordingly, in a lighting system that adopts the dimmer and uses the nonlinear load, a light source may not maintain uniform luminosity due to the unstable operating characteristic of the dimmer. In particular, if AC power is supplied to a light source in the AC direct type, the light source may emit light so that the light is irregularly shaken due to the output voltage of the dimmer having different positive output and negative output sizes. A phenomenon in which luminous intensity is irregularly changed and shaken in the light-emission state is called shimmer. In particular, the shimmer may become worse when a light source emits light with low luminous intensity.

Accordingly, in order to implement a dimming function using the dimmer, a lighting system having a nonlinear load needs to stabilize the light emission state of a light source.

SUMMARY

Various embodiments are directed to the provision of a lighting system capable of implementing a dimming function using a dimmer in accordance with a nonlinear load and a control circuit for the same.

Also, various embodiments are directed to a lighting system capable of providing a dimming function using a dimmer in accordance with a nonlinear load and solving shimmer attributable to an irregular output voltage of the dimmer and a control circuit for the same.

Also, various embodiments are directed to a lighting system capable of providing a dimming function using a dimmer in accordance with a nonlinear load, solving an unstable light emission state attributable to an irregular output voltage of the dimmer, reducing a production cost, and having improved electrical efficiency and a control circuit for the same.

In an embodiment, a lighting system may include a light source supplied with a rectified voltage obtained by controlling the phase of AC power using a dimmer, a power control unit configured to provide a current path for the light emission of the light source in accordance with a state of the rectified voltage, and a current controller configured to perform charging or discharging in response to the amount of current on the current path that is changed by characteristics of the dimmer and to control the amount of current for the light emission of the light source which flows in the current path in accordance with the charging or discharging.

In an embodiment, a control circuit for a lighting system may include a current buffer circuit connected to a current path for the light emission of a light source which uses a rectified voltage obtained by controlling the phase of AC power using a dimmer and configured to perform charging or discharging in response to the amount of current in the current path which is changed by the characteristics of the dimmer and to supply a charging voltage and a current control circuit configured to control the amount of current for the light emission of the light source which flows in the current path in response to the charging voltage of the current buffer circuit.

In an embodiment, a control circuit for a lighting system may include a filter configured to transfer power obtained by controlling the phase of AC power using a dimmer for the light emission of a light source. The filter may include a charging circuit configured to perform charging corresponding to the power and supply a charging voltage and a current control circuit configured to control a current transferred to the light source using the power in response to the charging voltage.

DETAILED DESCRIPTION

Figure 1:
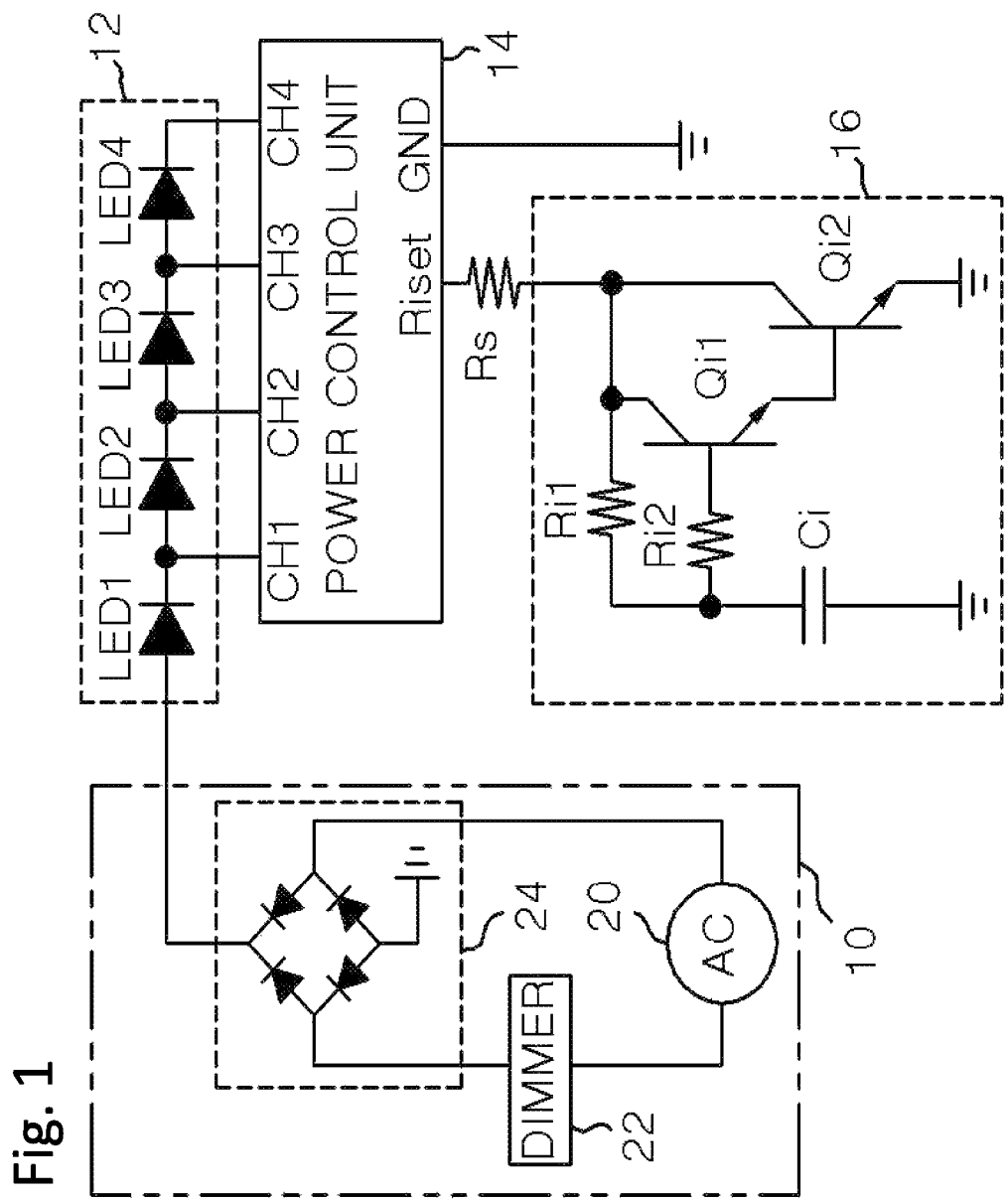
FIG. 1 is a circuit diagram of a lighting system according to an embodiment of the present invention.

Exemplary embodiments will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Throughout the disclosure, like reference numerals refer to like parts throughout the various figures and embodiments of the disclosure.

Embodiments of the present invention are described in detail below with reference to the accompanying drawings. Terms used in the specification and the claims should not be construed as having common or dictionary meanings, but should be construed as having meanings and concepts that comply with the technical field of the present disclosure.

The embodiments and drawings disclosed in this specification illustrate only exemplary embodiments of the present invention, and do not represent the entire technical spirit of the present invention. It should be understood that a variety of equivalents and modifications capable of replacing the embodiments may exist at the time of filing of this application.

FIG. 1 is a circuit diagram of a lighting system according to an embodiment of the present invention.

The embodiment of FIG. 1 may include a power circuit 10, a light source 12, a power control unit 14, and a filter 16.

The power circuit 10 outputs a rectified voltage using an AC voltage. To this end, the power circuit 10 may include AC power source 20, a dimmer 22, and a rectifier 24.

The AC power source 20 provides an AC voltage and may include a commercial AC power source.

Furthermore, the dimmer 22 performs a dimming function for triggering the phase of an AC voltage supplied by the AC power source 20. The construction and operation of the dimmer 22 are described in detail with reference to FIG. 2.

The dimmer 22 may have a leading edge type using a triac or a trailing edge type using a transistor or MOSFET. The leading edge type means that a rising edge is formed at the triggered phase of an AC voltage. In this type, a waveform is output after the rising edge. In contrast, the trailing edge type means that a falling edge is formed at the triggered phase of an AC voltage. A waveform is output prior to the falling edge. In an embodiment of the present invention, the dimmer 22 has been illustrated as having the leading edge type.

Furthermore, the rectifier 24 performs full-wave rectification on the output voltage of the dimmer 22 and thus outputs a rectified voltage. The rectifier 24 may be configured to have a known bridge diode configuration.

In this configuration, the power circuit 10 performs an operation for controlling the phase of the AC voltage of the AC power source 20 using the dimmer 22 and an operation for performing full-wave rectification on the output voltage of the dimmer 22 and outputting a rectified voltage.

The light source 12 may be supplied with a rectified voltage from the power circuit 10 and may perform a light emission operation corresponding to the rectified voltage. In an embodiment of the present invention, the light source 12 has been illustrated as using LEDs. For example, the light source 12 may include a plurality of LED channels LED1, LED2, LED3, and LED4. In this case, each of the LED channels LED1, LED2, LED3, and LED4 may include one or a plurality of LEDs.

Furthermore, the power control unit 14 provides a current path for the light emission of the light source 12 in accordance with the state of power applied to the light source 12, that is, a rectified voltage.

The power control unit 14 may have a flyback or buck type. Furthermore, the power control unit 14 may be configured to provide the light source 16 with a current in the AC direct type. That is, the power control unit 14 may be configured as a nonlinear load that has reactance or is driven in the AC direct type.

In an embodiment of the present invention, the power control unit 14 is assumed to be a nonlinear load driven in the AC direct type.

The power control unit 14 may include terminals CH1, CH2, CH3, and CH4 respectively connected to the output terminals of the LED channels LED1, LED2, LED3, and LED4 of the light source 12, a terminal Riset connected to a sensing resistor Rs, and a ground terminal GND that is grounded.

If only the LED channel LED1 emits light, the power control unit 14 may provide a current path formed between the terminal CH1 and the terminal Riset. If only the LED channels LED1 and LED2 emit light, the power control unit 14 may provide a current path formed between the terminal CH2 and the terminal Riset. If only the LED channels LED1, LED2, and LED3 emit light, the power control unit 14 may provide a current path formed between the terminal CH3 and the terminal Riset. If all the LED channels LED1, LED2, LED3, and LED4 emit light, the power control unit 14 may provide a current path formed between the terminal CH4 and the terminal Riset. If a rectified voltage is higher than each of the light emission voltages of the LED channels LED1, LED2, LED3, and LED4, the power control unit 14 may be configured to change a current path through internal current regulation.

If a rectified voltage increases due to a correlation between the light source 12 and the power control unit 14, the number of LED channels that emit light is increased. In contrast, if a rectified voltage drops, the number of LED channels that emit light is decreased. Furthermore, the power control unit 14 may provide a current path changed in response to a change of the light emission state.

The amount of a current on a current path is stepwise increased depending on a change of a rectified voltage, that is, the light emission state of an LED channel. A current flowing in a current path may be detected by the sensing resistor Rs. That is, a current flowing in the sensing resistor Rs may be a constant current in accordance with the light emission of a specific LED channel. Furthermore, a current flowing in the sensing resistor Rs may have a stepped waveform that stepwise increases or fall in response to a change of a current path.

The filter 16 configured as a current controller is connected to the power control unit 14 through the sensing resistor Rs. The filter 16 performs charging or discharging in response to the amount of current on a current path that is changed depending on the characteristics of the dimmer 22 and controls the amount of current flowing in a current path so that the light source 12 emits light in accordance with charging or discharging.

To this end, the filter 16 may be configured to equalize the amount of current that flows on a current path by performing charging and discharging in one cycle unit of AC power. The filter 16 may have a time constant that is two times or more of the cycle of AC power for discharging in order to control the amount of current flowing in a current path.

More specifically, the filter 16 may include a current buffer circuit and a current control circuit.

The current buffer circuit may include a resistor Ri1, a resistor Ri2, and a capacitor Ci, and it is connected to a current path. The current buffer circuit performs charging and discharging, has a time constant corresponding to a cycle that is two times or more of AC power, and may provide a charging voltage changed by a time constant.

The capacitor Ci performs charging and discharging and provides a charging voltage. Furthermore, the resistor Ri1 is connected between the current path of the power control unit 14 and the capacitor Ci through the sensing resistor Rs, and it provides a charging path for the capacitor Ci. Furthermore, the resistor Ri2 provides a charging voltage to the base of the transistor Qi1 of the current control circuit. In this case, a time constant may be determined by the impedance values of the capacitor Ci and the resistors Ri1 and Ri2.

Furthermore, the current control circuit may include the transistors Qi1 and Qi2, and it is included in the current path of the power control unit 14. The current control circuit may be configured to control a flow of current on a current path in response to a charging voltage.

More specifically, the transistors Qi1 and Qi2 of the current control circuit have collectors commonly connected to the current path of the power control unit 14 through the sensing resistor Rs and are coupled in a Darlington structure. Accordingly, the transistor Qi1 provides a current to the base of the transistor Qi2 using a charging voltage applied to the base of the transistor Qi1. The transistor Qi2 controls the amount of current flowing in the sensing resistor Rs, that is, a current path, in response to the amount of current flowing in the base of the transistor Qi2. In the present embodiment, the transistors Qi1 and Qi2 have been illustrated as being NPN bipolar transistors, but the present invention is not limited thereto. For example, the transistors Qi1 and Qi2 may be PNP bipolar transistors or FETs capable of current control.

Figure 2:
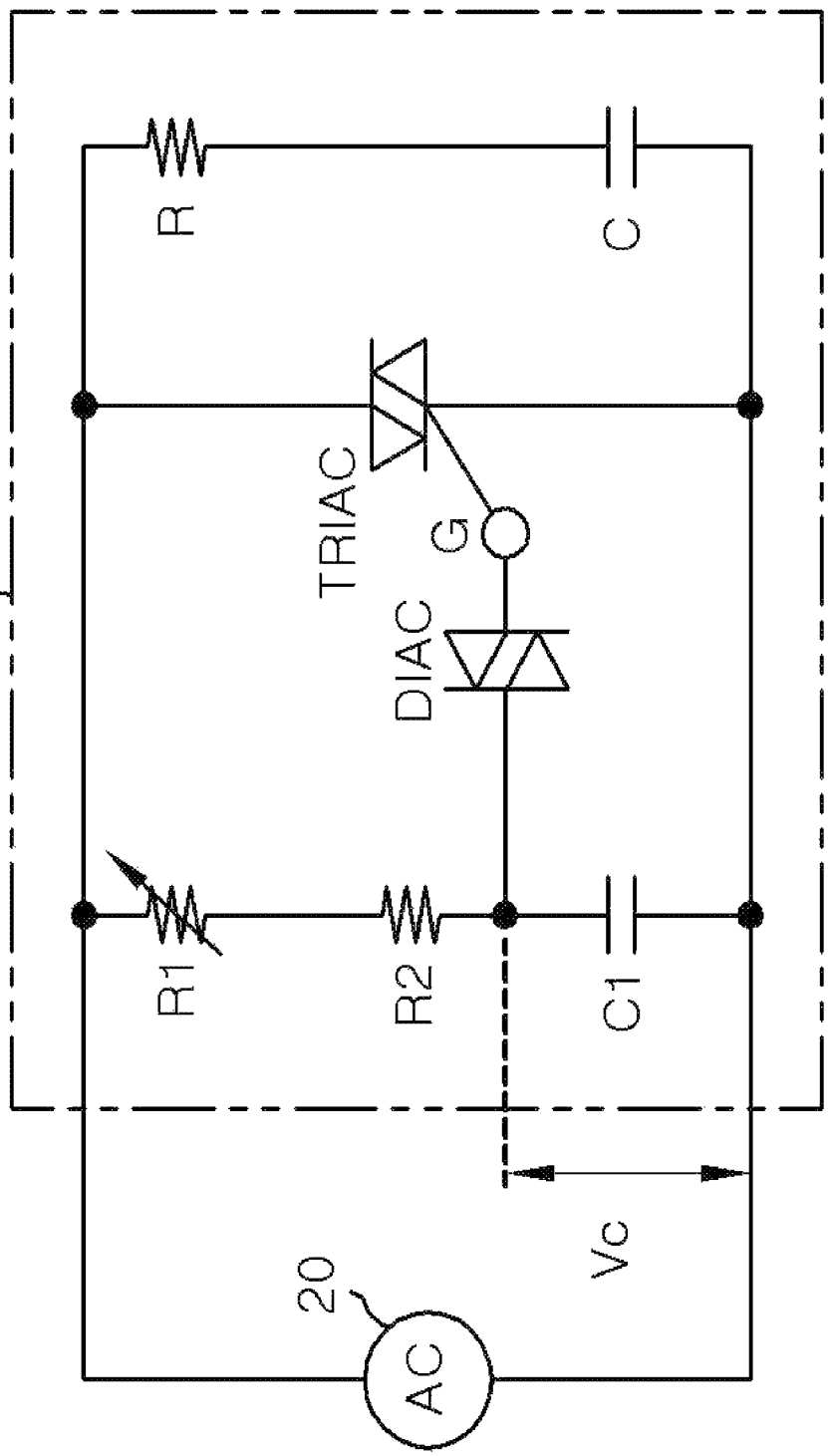
FIG. 2 is a detailed circuit diagram of a dimmer illustrated in FIG. 1.

The dimmer 22 is described below with reference to FIG. 2.

The dimmer 22 may include a variable resistor R1, a resistor R2, a capacitor C1, a DIAC, a TRIAC, a resistor R, and a capacitor C. The variable resistor R1, the resistor R2, and the capacitor C1 are connected in series. Furthermore, a node between the resistor R2 and the capacitor C1 is connected to one side of the DIAC. The DIAC functions to transfer the charging voltage Vc of the capacitor C1 to the gate G of the TRIAC. The turn-on of the TRIAC is controlled by the charging voltage Vc supplied by the DIAC. Furthermore, the resistor R and the capacitor C perform a filter function.

Figure 3:
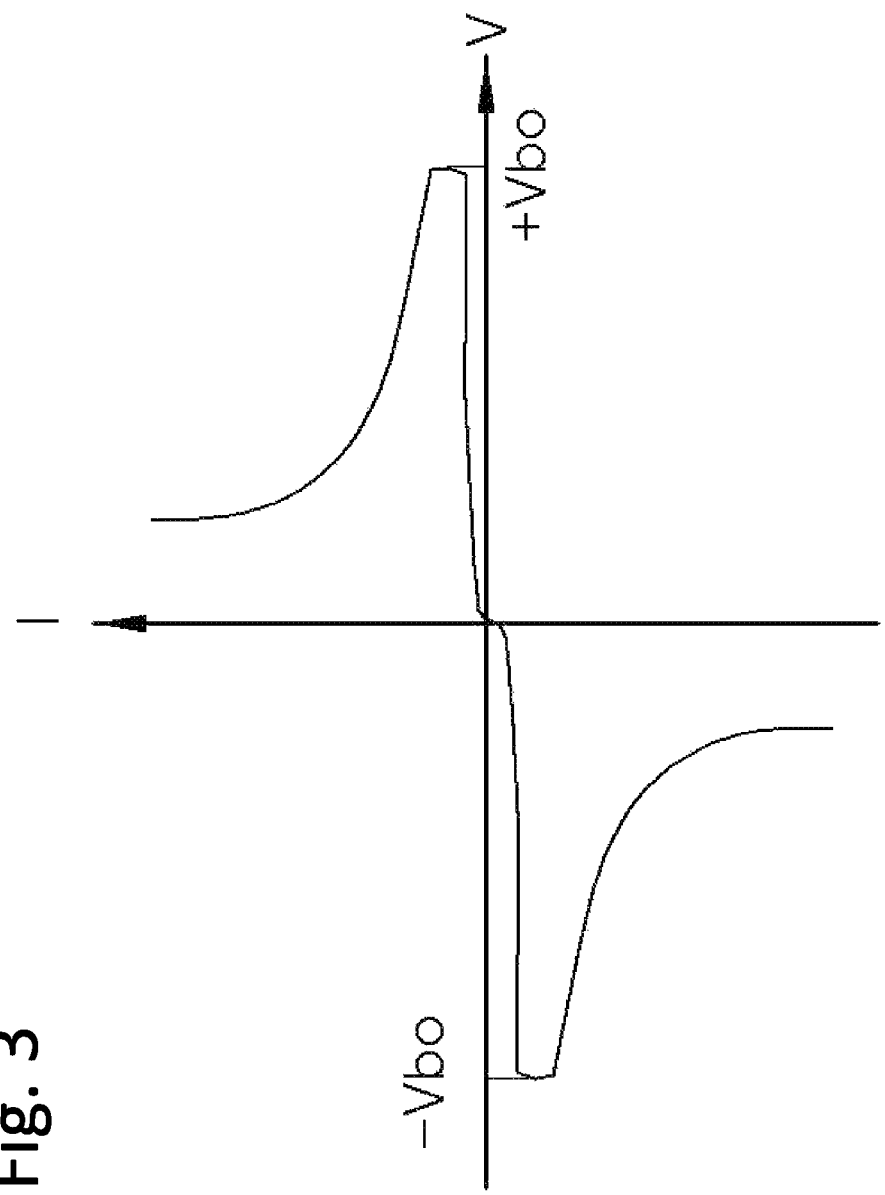
FIG. 3 is a waveform illustrating the relationship between the voltage and current of a diac illustrated in FIG. 2.

In the dimmer 22, a level of the charging voltage Vc of the capacitor C1 has an influence on the operation of the DIAC. That is, the DIAC has an operating characteristic in which it is turned on in response to a positive charging voltage Vc of a specific level or more or a negative charging voltage Vc of a specific level or more. That is, the DIAC has an operating characteristic in which it switches a flow of current as illustrated in FIG. 3. The DIAC is turned on when a potential difference is a breakdown voltage +Vbo or more or a breakdown voltage −Vbo or less.

When the DIAC is turned on, the TRIAC performs a trigger operation in response to the charging voltage Vc.

A point of time at which the trigger operation of the TRIAC is started is a point of time at which the phase of an AC voltage is triggered. Accordingly, the TRIAC periodically starts the trigger operation at each point of time at which the charging voltage Vc reaches the breakdown voltage +Vbo, −Vbo. As a result, the phase of an AC voltage is triggered.

A point of time at which the phase of an AC voltage is triggered may be controlled by the variable resistor R1. If the resistance value of the variable resistor R1 drops, a point of time at which the trigger operation of the TRIAC is started becomes fast because charging speed of the capacitor C1 becomes fast, and thus the amount of current supplied to the light source 12 is increased. That is, the waveform of the charging voltage Vc shifts from "Vc" to "Vcd", as indicated by an arrow A in FIG. 4. Accordingly, the trigger phase of the AC voltage is controlled in the direction of an arrow B.

In contrast, if the resistance value of the variable resistor R1 increases, a point of time at which the trigger operation of the TRIAC is started becomes slow because charging speed of the capacitor C1 becomes slow, and thus the amount of current supplied to the light source 12 is decreased. That is, the waveform of the charging voltage Vc shifts in the direction opposite the arrow A of FIG. 4. Accordingly, the trigger phase of the AC voltage is controlled in the direction opposite the direction of the arrow B.

Figure 4:
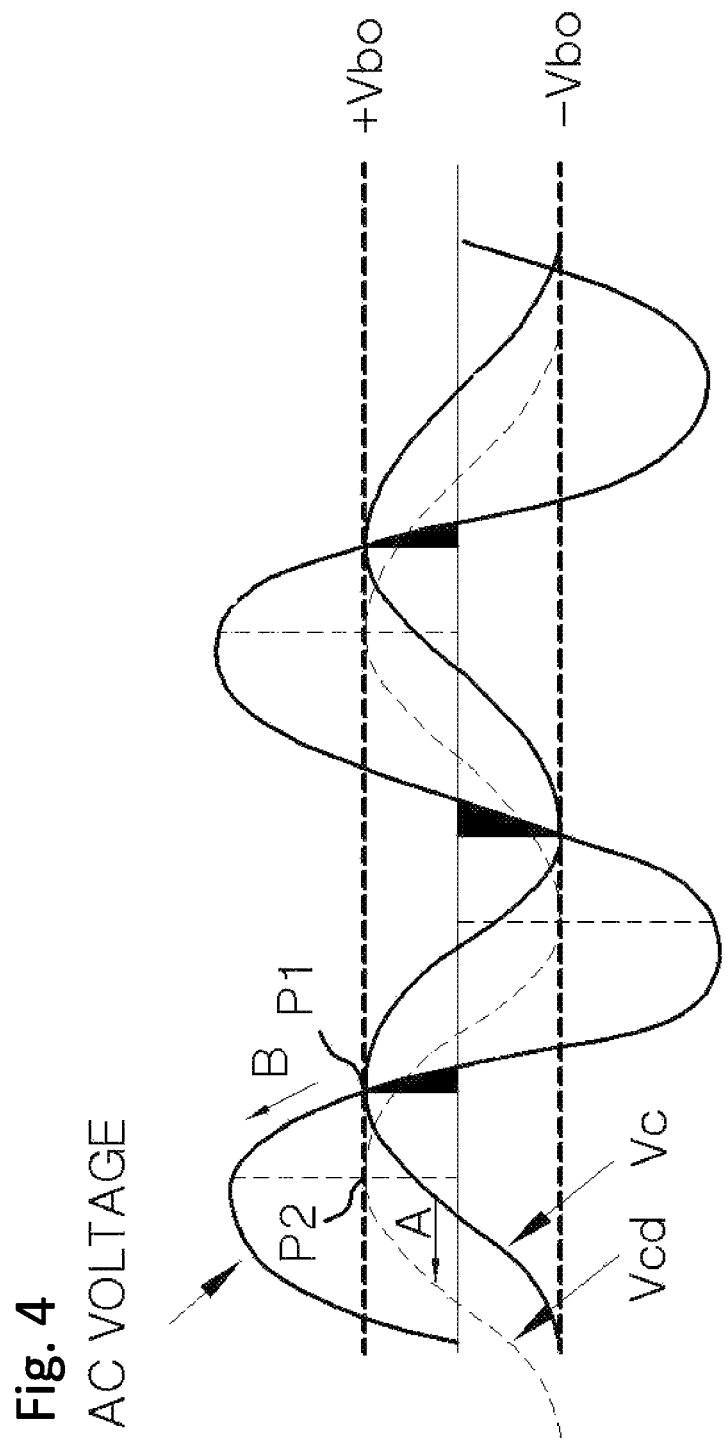
FIG. 4 is a waveform illustrating the relationship between an AC voltage and an AC voltage having a phase delayed for dimming control.

In FIG. 4, P1 denotes a point of time at which the charging voltage Vc has reached the breakdown voltage +Vbo, and P2 denotes a point of time at which the charging voltage Vcd having a shifted phase has reached the breakdown voltage +Vbo.

That is, a point of time at which the trigger operation of the TRIAC is started may be controlled by controlling the resistance value of the variable resistor R1 as illustrated in FIG. 4. As a result, as illustrated in FIG. 4, an AC voltage (i.e., a solid hashed part) having a controlled trigger phase may be supplied from the dimmer 22 to the rectifier 24.

The dimmer 22 guarantees a flow of current after a point of time at which the trigger operation of the TRIAC is started. As a result, the phase of an AC voltage is controlled in the leading edge type.

Figure 5:
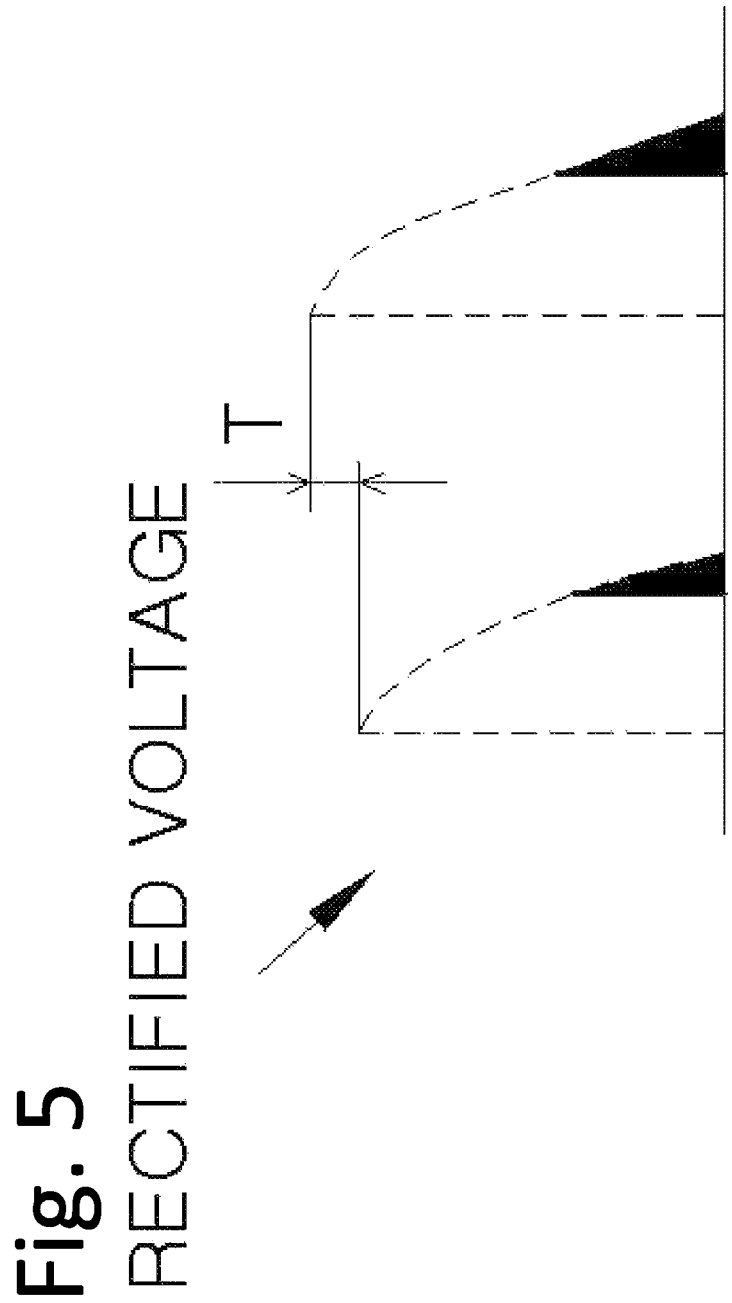
FIG. 5 is a waveform illustrating a rectified voltage having a phase delayed.

Furthermore, the rectifier 24 may perform full-wave rectification on the AC voltage of the dimmer 22 that has a controlled trigger phase and thus output a rectified voltage, such as that of FIG. 5.

As described above, the power unit 10 may provide the filter 16 with a rectified voltage having a controlled trigger phase, such as that of FIG. 5. The filter 16 performs a charging operation and current control corresponding to the rectified voltage.

Referring to FIG. 5, the rectified voltage may be generated in a half cycle unit of an AC voltage. That is, the rectified voltage includes a waveform corresponding to the positive region and negative region of the AC voltage. However, the rectified voltage has a difference in the amplitude T between the positive region and the negative region due to the characteristics of the dimmer 22.

If the light source 12 emits light using a rectified voltage having a difference in the amplitude between a positive region and a negative region as illustrated in FIG. 5, shimmer in which the light emission state is shaken may be generated.

Figure 6:
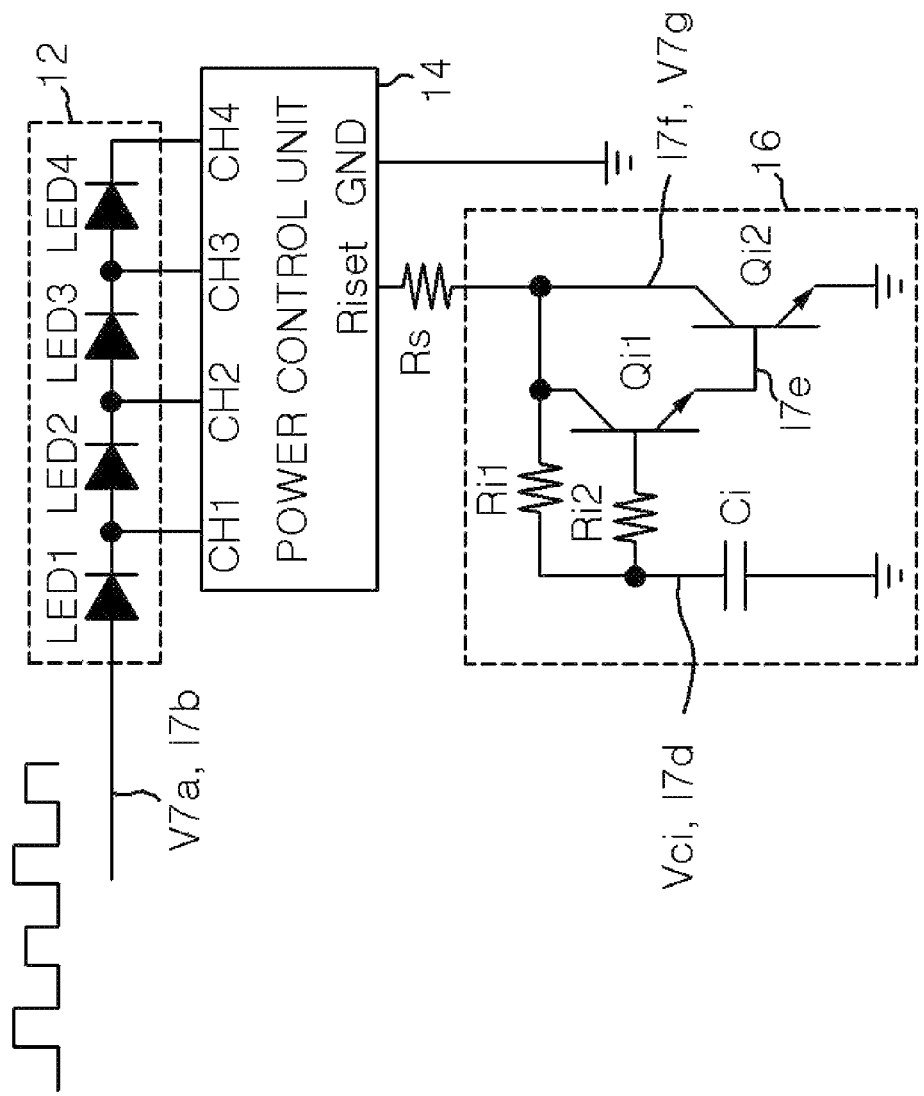
FIG. 6 is a block diagram illustrating a simulation method according to the embodiment of FIG. 1.

An embodiment of the present invention can solve the shimmer using the filter 16. The solving of the shimmer using the filter 16 in accordance with an embodiment of the present invention is described with reference to FIG. 6. FIG. 6 is a circuit diagram illustrating that simulations are executed by repeatedly providing square waves having a difference in the amplitude in accordance with the rectified voltage of FIG. 5. The results of the simulations may be illustrated as in FIG. 7.

Figure 7:
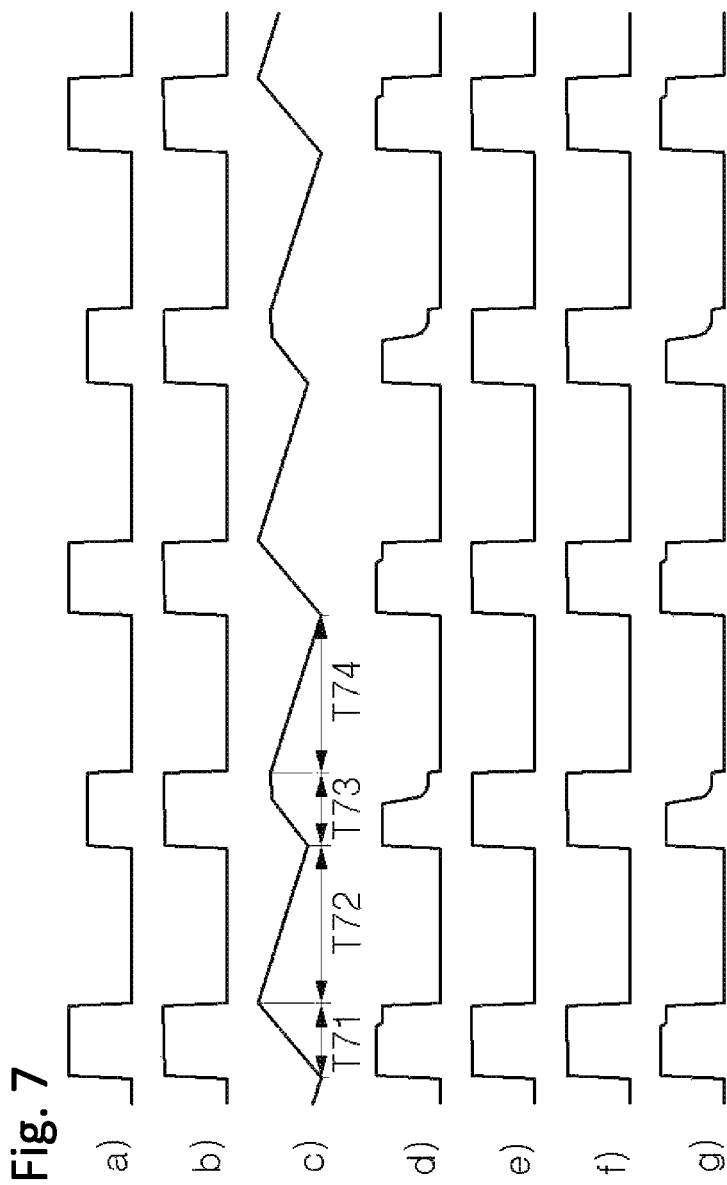
FIG. 7 is a waveform illustrating the results of simulations in FIG. 6.

In FIG. 7, a) is an input voltage V7a to the light source 12 that has replaced a rectified voltage, b) is an input current I7b to the light source 12, c) is the charging voltage Vci of the capacitor Ci, d) is a current I7d charged in the capacitor Ci through the sensing resistor Rs and the resistor Ri1, e) is a current I1e supplied to the base of the transistor Qi2, f) is a current I7f input to the collector of the transistor Qi2, and g) is the collector-emitter voltage V7g of the transistor Qi2.

When the input voltage V7a having a difference in the amplitude is repeatedly applied to the light source 12 as in a) of FIG. 7, the amount of the current I7d flowing in the current path of the power control unit 14 may be changed depending on the difference in the amplitude of the input voltage V7a, as in d) of FIG. 7. If the filter 16 in accordance with an embodiment of the present invention is not applied, the light source 12 may emit light with luminosity corresponding to the amount of the current I7d that flows in the sensing resistor Rs, as in d) of FIG. 7. In this case, the amount of the current I7d illustrated in d) of FIG. 7 is repeatedly changed in accordance with the difference in the amplitude of the input voltage V7a. As a result, the amount of current for the light emission of the light source 12 is repeatedly changed, thereby resulting in shimmer.

The filter 16 in accordance with an embodiment of the present invention may control the amount of current for the light emission of the light source 12 so that it is equalized as illustrated in f) of FIG. 7 by performing charging and discharging and current control although an input voltage having a difference in the amplitude is repeatedly supplied. Accordingly, the generation of shimmer can be prevented.

More specifically, the capacitor Ci of the filter 16 performs charging in a first charging section T71 in which the input voltage V7a having a great amplitude is maintained and a second charging section T73 in which the input voltage V7a having a small amplitude is maintained.

Furthermore, the capacitor Ci of the filter 16 performs discharging based on a time constant in a first discharging section T72, that is, in a section from the time when the application of the input voltage V7a having the great amplitude is finished to the time when the application of the input voltage V7a having the small amplitude is started, and in a second discharging section T74, that is, in a section from the time when the application of the input voltage V7a having the small amplitude is finished to the time when the application of the input voltage V7a having the great amplitude is started.

The capacitor Ci performs charging so that it has the charging voltage Vci of a higher level in the first charging section T71 than in the second charging section T73. A level of the charging voltage Vci at a point of time at which the first discharging section T72 is started is higher than a level of the charging voltage Vci at a point of time at which the second discharging section T74 is started. Furthermore, the same time constant is applied to the discharging of the capacitor Ci in the first discharging section T72 and the second discharging section T74. Assuming that the time when the first discharging section T72 is maintained and the time when the second discharging section T74 is maintained are the same, a level of the charging voltage Vci at the point of time at which the first discharging section T72 is finished, that is, at the point of time at which the second charging section T73 is started, is higher than that of the charging voltage Vci at the point of time at which the second discharging section T74 is finished, that is, at the point of time at which the first charging section T71 is started.

Accordingly, although an input voltage having a great amplitude and an input voltage having a small amplitude are applied, the same amount of current is supplied to the base of the transistor Qi1 in the first charging section T71 and the second charging section T73. As a result, the same amount of current is supplied to the base of the transistor Qi2 in the first charging section T71 and the second charging section T73. Accordingly, the transistor Qi2 controls the amount of current flowing in the first charging section T71 and the amount of current flowing in the second charging section T73 so that they are the same.

As described above, the filter 16 in accordance with an embodiment of the present invention performs an operation so that the amount of current corresponding to an input voltage having a great amplitude and the amount of current corresponding to an input voltage having a small amplitude are equalized, as illustrated in f) of FIG. 7.

Accordingly, in accordance with an embodiment of the present invention, the amount of current for the light emission of the light source 12 can be equalized by the operation of the filter 16 although an input voltage having a difference in the amplitude is repeatedly applied. That is, the light source 12 can have uniform luminosity, thereby being capable of preventing shimmer from occurring.

Figure 8:
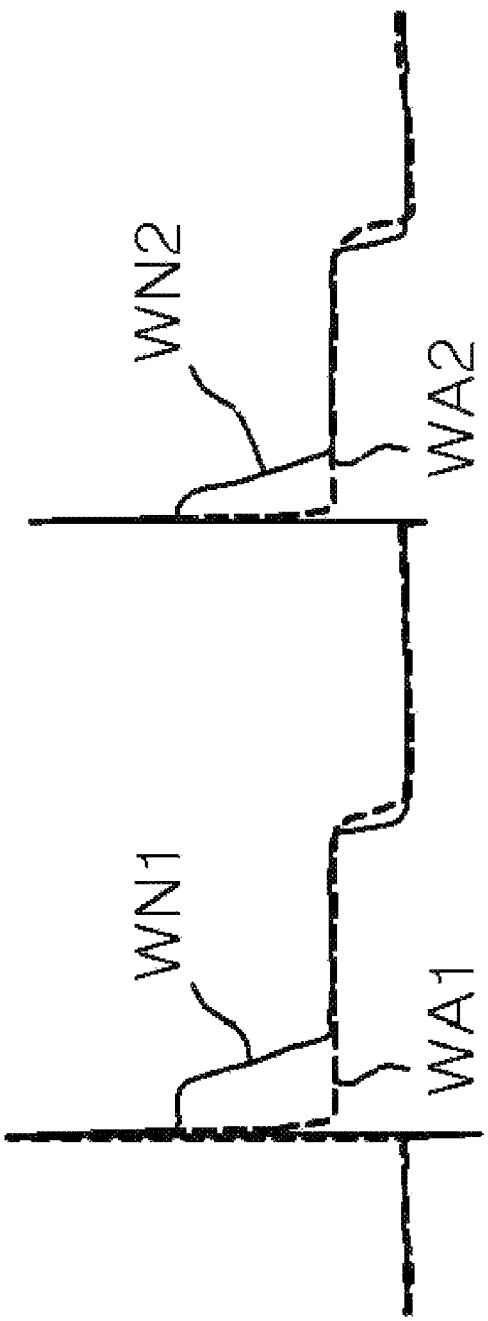
FIG. 8 is a waveform illustrating a comparison between a case where a filter of FIG. 1 is present and a case where a filter of FIG. 1 is not present.

FIG. 8 illustrates the waveforms WN1 and WN2 of actually measured currents when the filter 16 is not used and the waveforms WA1 and WA2 of actually measured currents when the filter 16 is used in order to compare the waveforms with the simulation results of FIGS. 6 and 7.

From FIG. 8, it may be seen that there is a difference in the amount of current between the waveform WN1 corresponding to an input voltage having a great amplitude and the waveform WN2 corresponding to an input voltage having a small amplitude when the filter 16 is not used.

In contrast, it may be seen that a difference in the amount of current between the waveform WA1 corresponding to an input voltage having a great amplitude and the waveform WA2 corresponding to an input voltage having a small amplitude is very small when the filter 16 is used.

Figure 9:
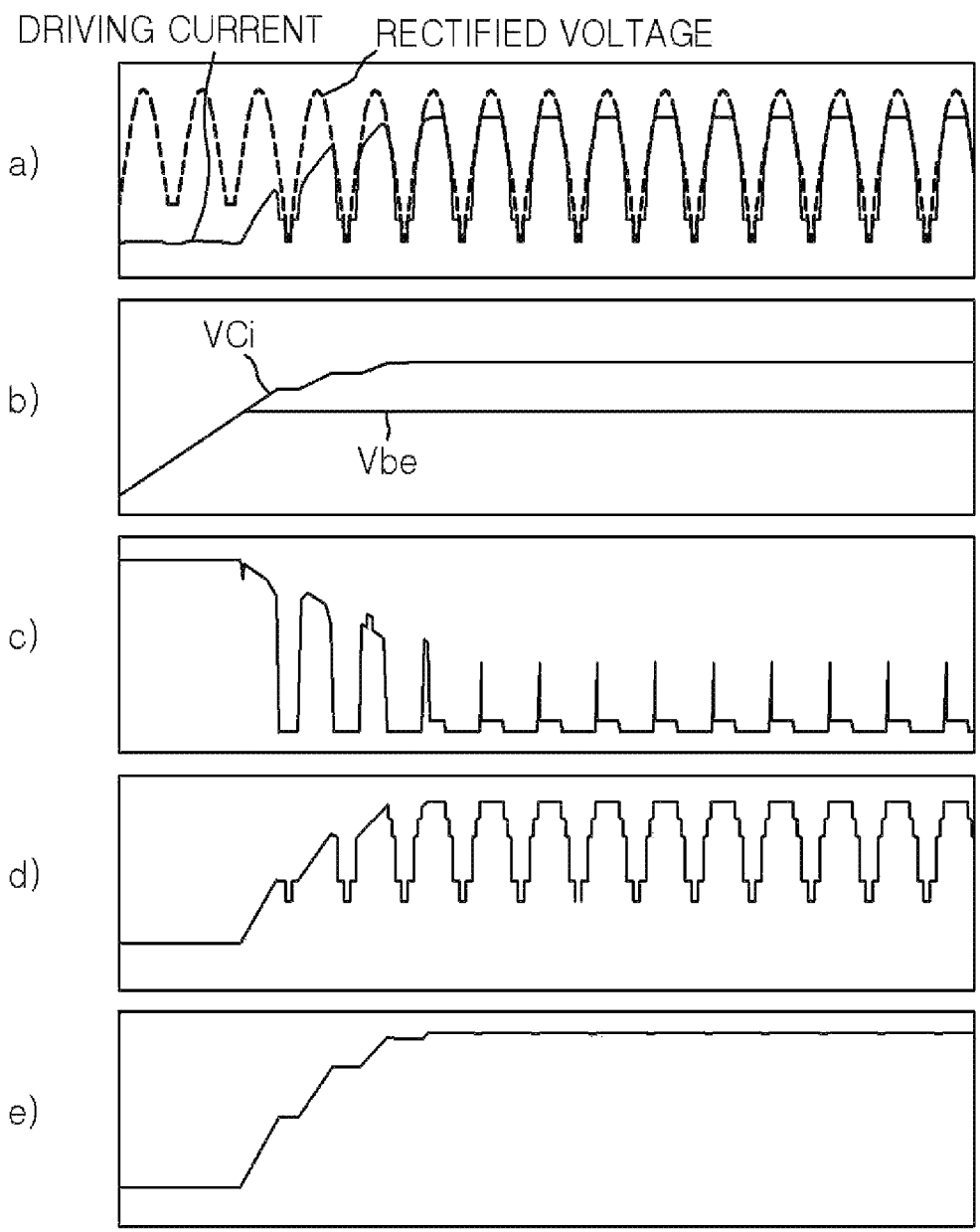
FIG. 9 illustrates waveforms according to the embodiment of FIG. 1 corresponding to rectified voltages of a full angle.

The operation of the lighting system of FIG. 1 corresponding to a rectified voltage of a full angle may be described as follows with reference to FIG. 9.

a) of FIG. 9 illustrates a rectified voltage applied to the light source 10 and a driving current that makes the light source 12 emit light. b) of FIG. 9 illustrates the charging voltage VCi of the capacitor Ci and the base-emitter voltage of the transistor Qi1. c) of FIG. 9 illustrates the collector-emitter voltage of the transistor Qi2. d) of FIG. 9 illustrates the base current of the transistor Qi2. e) of FIG. 9 illustrates the base current of the transistor Qi1.

Referring to the waveforms of FIG. 9, in an embodiment of the present invention, a current path enough for the light source 12 to emit light is not formed until the base-emitter voltage Vbe of the transistor Qi1 reaches a specific level in accordance with an initial section in which the application of a rectified voltage is started.

After a lapse of a specific time since the rectified voltage is applied, when the charging voltage VCi of the capacitor Ci and the base-emitter voltage Vbe of the transistor Qi1 reach a specific level, current control according to the operation of the transistor Qi1 is started. That is, in a stable state in which the charging voltage VCi of the capacitor Ci has reached the specific level, the base current of the transistor Qi1 in e) of FIG. 9 slowly increases. Accordingly, the base current of the transistor Qi2 in d) of FIG. 9 d) also slowly increases. The base current of the transistor Qi1 and the base current of the transistor Qi2 form similar envelopes. Furthermore, when the operations of the transistors Qi1 and Qi2 are activated, the collector-emitter voltage of the transistor Qi2 in c) of FIG. 9 gradually drops.

In an embodiment of the present invention, a flow of current on the current path of the power control unit 14 is controlled by the charging voltage VCi of the capacitor Ci and the operating states of the transistors Qi1 and Qi2. Accordingly, a driving current supplied to the light source 12 in the state in which a rectified voltage is unstable in a moment can be stably controlled by the filter 16 based on the above principle.

Accordingly, an embodiment of the present invention has an advantage in that it can improve shimmer when a dimming function using a dimmer is implemented in accordance with a nonlinear load of an AC direct type.

Furthermore, an embodiment of the present invention can improve shimmer using a cheap part, such as a stack type capacitor, an NPN bipolar transistor, or a Darlington circuit. Accordingly, a production cost can be reduced.

Furthermore, an embodiment of the present invention can obtain excellent electrical efficiency because the filter can be configured to have high efficiency of low power.

The embodiments of FIGS. 1 to 6 propose the improvement of shimmer by controlling a current on the current path of the power control unit 14.

Furthermore, in accordance with another embodiment of the present invention, shimmer that may occur due to a dimmer can be improved by controlling a current supplied to a load.

Figure 10:
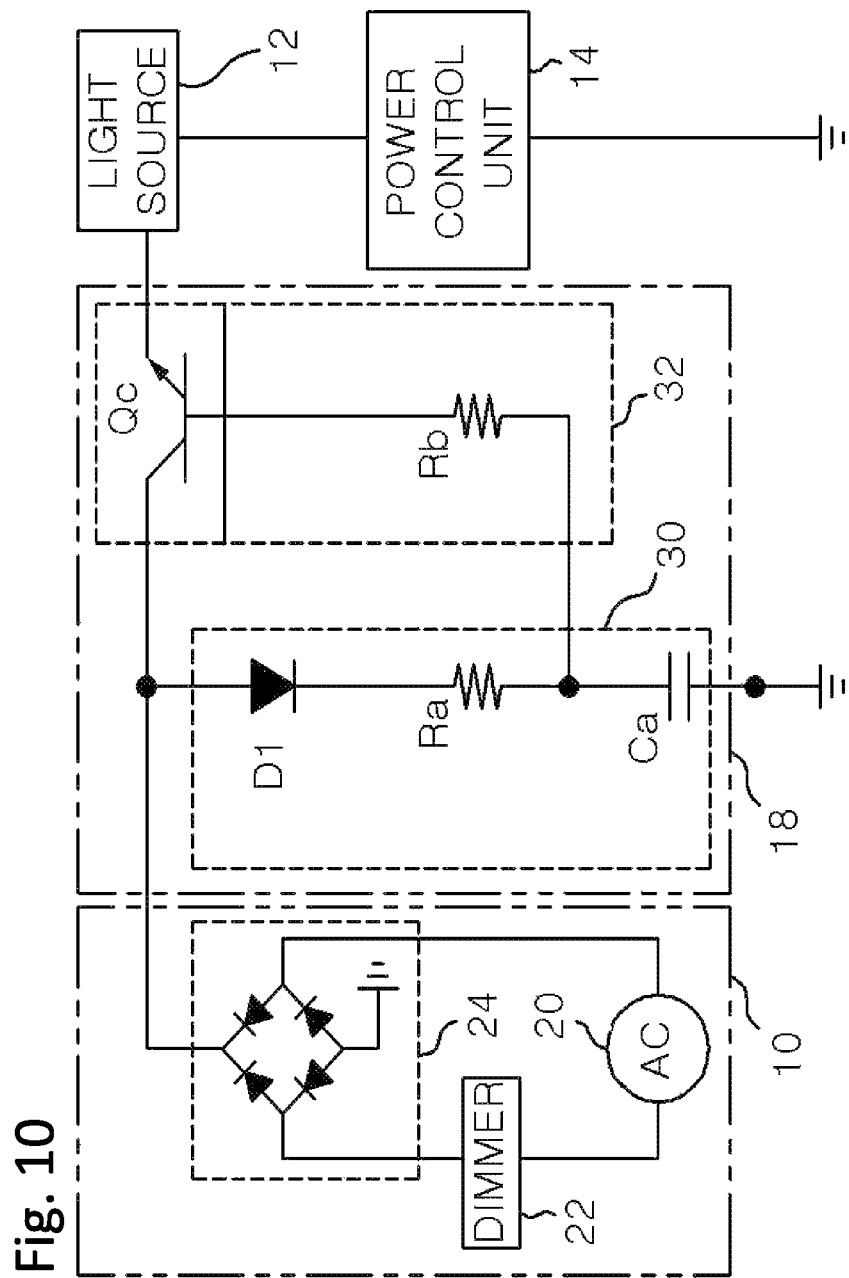
FIG. 10 is a circuit diagram of a lighting system according to another embodiment of the present invention.

To this end, a lighting system of FIG. 10 may be configured. In the lighting system of FIG. 10, a filter 18 is configured between the power circuit 10 and the light source 12. The lighting system of FIG. 10 differs from that of FIG. 1 in the location and configuration of the filter 18.

Accordingly, redundant descriptions of the power circuit 10, the light source 12, and the power control unit 14 are omitted.

The configuration and operation of the embodiment of FIG. 10 are described below.

The filter 18 may be configured to transfer a rectified voltage, having a phase obtained by controlling AC power using the dimmer 22, for the light emission of the light source 12. To this end, the filter 18 may include a charging circuit 30 and a current control circuit 32. The charging circuit 30 is configured to perform charging corresponding to power supplied by the power circuit 10, that is, a rectified voltage, and provide a charging voltage. Furthermore, the current control circuit 32 is configured to primarily control a current supplied to the light source 12 using the charging voltage.

The charging circuit 30 may include a diode D1, a resistor Ra, and a capacitor Ca. The charging circuit 30 forms a closed loop along with the power circuit 10. The diode D1, the resistor Ra, and the capacitor Ca are connected in series in order to form the closed loop.

In such a configuration, the diode D1 blocks a reverse bias path from being formed by a rectified voltage. More specifically, the charging circuit 30 is supplied with a rectified voltage having a region where a voltage level becomes zero. Accordingly, the charging voltage of the capacitor Ca may be temporarily higher than the rectified voltage of the power circuit 10. In this case, a reverse bias path may be formed due to the charging voltage. However, a flow of a current through the reverse bias path can be blocked by the diode D1.

Furthermore, the resistor Ra transfers a rectified voltage to the capacitor Ca through the diode D1. The capacitor Ca performs charging and provides a charging voltage. In such a configuration, the resistor Ra and the diode D1 function as a circuit for supplying the capacitor Ca with a rectified voltage supplied to the current control circuit 32 for a charging purpose.

Accordingly, the charging circuit 30 may charge the capacitor Ca with a rectified voltage received through the diode D1 and the resistor Ra and provide the current control circuit 32 with the charging voltage of the capacitor Ca.

The current control circuit 32 controls a current supplied to the power control unit 14. Current control may be performed in response to a charging voltage supplied by the charging circuit 30. Furthermore, the current control circuit 32 may include an NPN bipolar transistor Qc and a resistor Rb for the current control.

The NPN bipolar transistor Qc may be configured to have a collector connected in parallel to the diode D1 of the charging circuit 30, an emitter connected to the light source 12, and a base connected to a node between the capacitor Ca and the resistor Ra through the resistor Rb.

Accordingly, the charging voltage of the capacitor Ca is supplied to the base of the NPN bipolar transistor Qc through the resistor Rb. The NPN bipolar transistor Qc limits a current, transferred from the power circuit 10 to the power control unit 14, in response to the charging voltage.

The resistor Rb may be configured to have a higher resistance value than the resistor Ra. The resistor Rb may have a resistance value set so that a current necessary for the NPN bipolar transistor Qc to be turned on is provided.

The operation of the lighting system of FIG. 10 in accordance with an embodiment of the present invention may be described as follows with reference to FIGS. 11 and 12.

Figure 11:
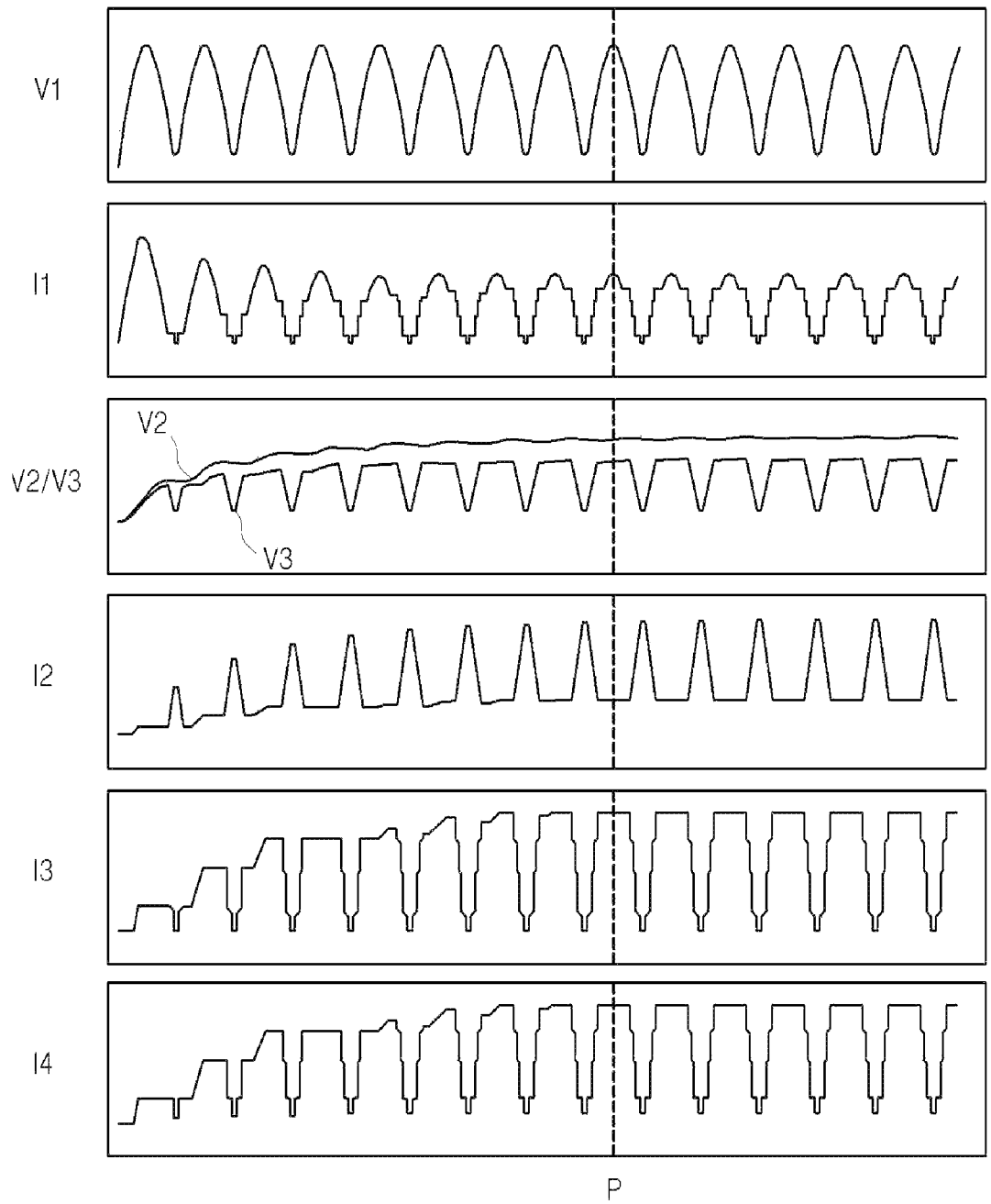
FIG. 11 illustrates waveforms according to the embodiment of FIG. 10 corresponding to rectified voltages of a full angle.
Figure 12:
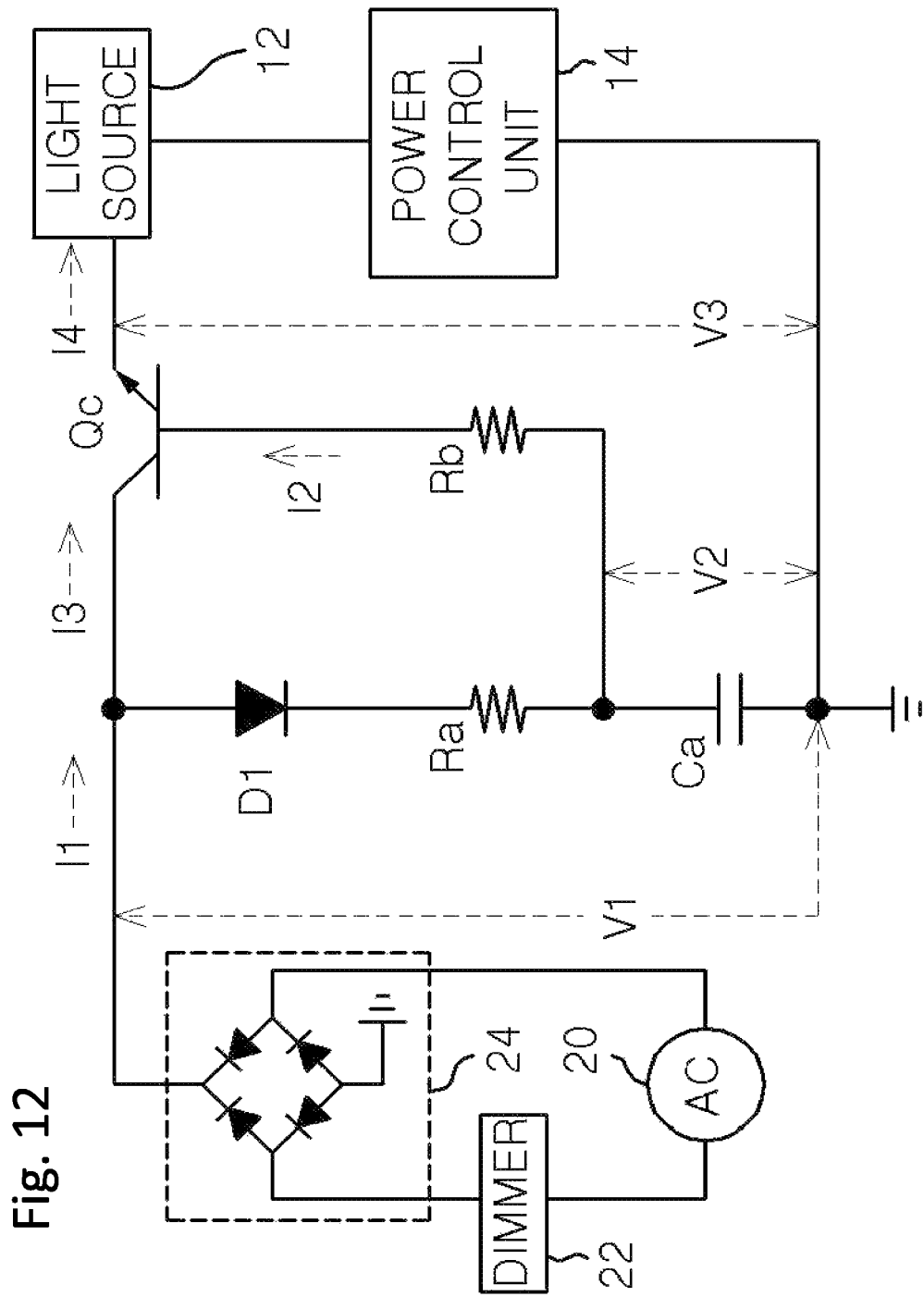
FIG. 12 is a circuit diagram according to the embodiment of FIG. 10 for illustrating the waveforms of FIG. 11.

FIG. 11 illustrates waveforms when a rectified voltage having a phase controlled so that it has a full angle is supplied by the power circuit 10. Furthermore, FIG. 12 illustrates locations where voltages and currents are formed in the circuit diagram of FIG. 10 with reference to the waveforms of FIG. 11. In FIG. 11, a state prior to a location P means a transient state, and a state after the location P means a stable state.

In FIG. 11, V1 is a rectified voltage output by the power circuit 10, I1 is a current that flows in a node between the power circuit 10 and the charging circuit 30 of the filter 18, V2 is the charging voltage of the capacitor Ca, and V3 is a voltage supplied to the light source 12 and the power control unit 14, that is, loads. The charging voltage V2 and the voltage V3 supplied to the loads are illustrated in a single waveform for a comparison. In this case, the rectified voltage V1 has ripples because it is output as a result of full-wave rectification performed on an AC by the rectifier 24. Furthermore, the charging voltage V2 is formed to have a waveform whose DC level is gradually increased. The voltage V3 supplied to the loads has ripple components corresponding to the rectified voltage V1.

In FIG. 11, I2 is a current supplied to the base of the NPN bipolar transistor Qc, I3 is a current supplied to the collector of the NPN bipolar transistor Qc, and I4 is a current output by the emitter of the NPN bipolar transistor Qc, that is, a current supplied to the light source 12 and the power control unit 14 that are loads.

The filter 18 is supplied with the rectified voltage V1 and the current I1 from the power circuit 10. When power is first supplied, the current I1 supplied by the power circuit 10 may be supplied to the transient state. The diode D1 and resistor Ra of the charging circuit 30 provide a current path so that a current is supplied to the capacitor Ca. The capacitor Ca of the charging circuit 30 performs charging corresponding to the rectified voltage V1.

The charging voltage V2 stored in the capacitor Ca forms an envelope that is gradually increased over time, and it increases during the transient state.

When the charging voltage V2 of the capacitor Ca increases, the current I2 flowing through the resistor Rb gradually increases. An increase of the current I2 has an influence on the operation of the NPN bipolar transistor Qc. That is, the amount of current that passes through the NPN bipolar transistor Qc is increased in accordance with an increase of the current I2. That is, the current I3 input to the NPN bipolar transistor Qc and the current I4 output by the NPN bipolar transistor Qc are gradually increased.

The current passing through the transistor Qc is influenced by the current regulation operation of the power control unit 14. The power control unit 14 performs current control according to current regulation and thus controls a current flowing in the light source 12 so that the current has a stepped waveform that is periodically increased or decreased in accordance with a rise and fall in the rectified voltage V1.

Accordingly, the power control unit 14 controls the light source 12 so that the voltage V3 applied to the light source 12 is gradually increased in accordance with an increase of the current.

The charging voltage V2 is gradually increased while power is supplied to the transient state. When the power is supplied to the stable state, it maintains a constant level. The charging voltage V2 corresponding to the transient state does not have a level enough for the NPN bipolar transistor Qc to bypass most of a current. Accordingly, in the transient state, the NPN bipolar transistor Qc limits the amount of current that is transferred with a maximum current or less. The current I2 supplied to the base of the NPN bipolar transistor Qc is clamped, thus following an increase of the charging voltage V2. Accordingly, the current I3 input to the NPN bipolar transistor Qc and the current I4 output by the NPN bipolar transistor Qc also have an envelope that follows an increase of the charging voltage V2.

That is, in the transient state, current control through the NPN bipolar transistor Qc is performed, thereby being capable of improving shimmer that may occur due to an unstable rectified voltage.

Furthermore, the charging voltage V2 corresponding to the stable state has a level enough for the NPN bipolar transistor Qc to be able to bypass most of a rectified voltage. Accordingly, the NPN bipolar transistor Qc may transfer a current by which the light source 12 can have sufficient luminosity. In this case, the voltage V3 has a waveform having a shape in which the top of a ripple waveform has been cut by a level corresponding to a threshold voltage due to the operating characteristics of the NPN bipolar transistor Q3.

As a result, an effect in which shimmer is improved by the same operation as a dimming operation can be expected.

Figure 13:
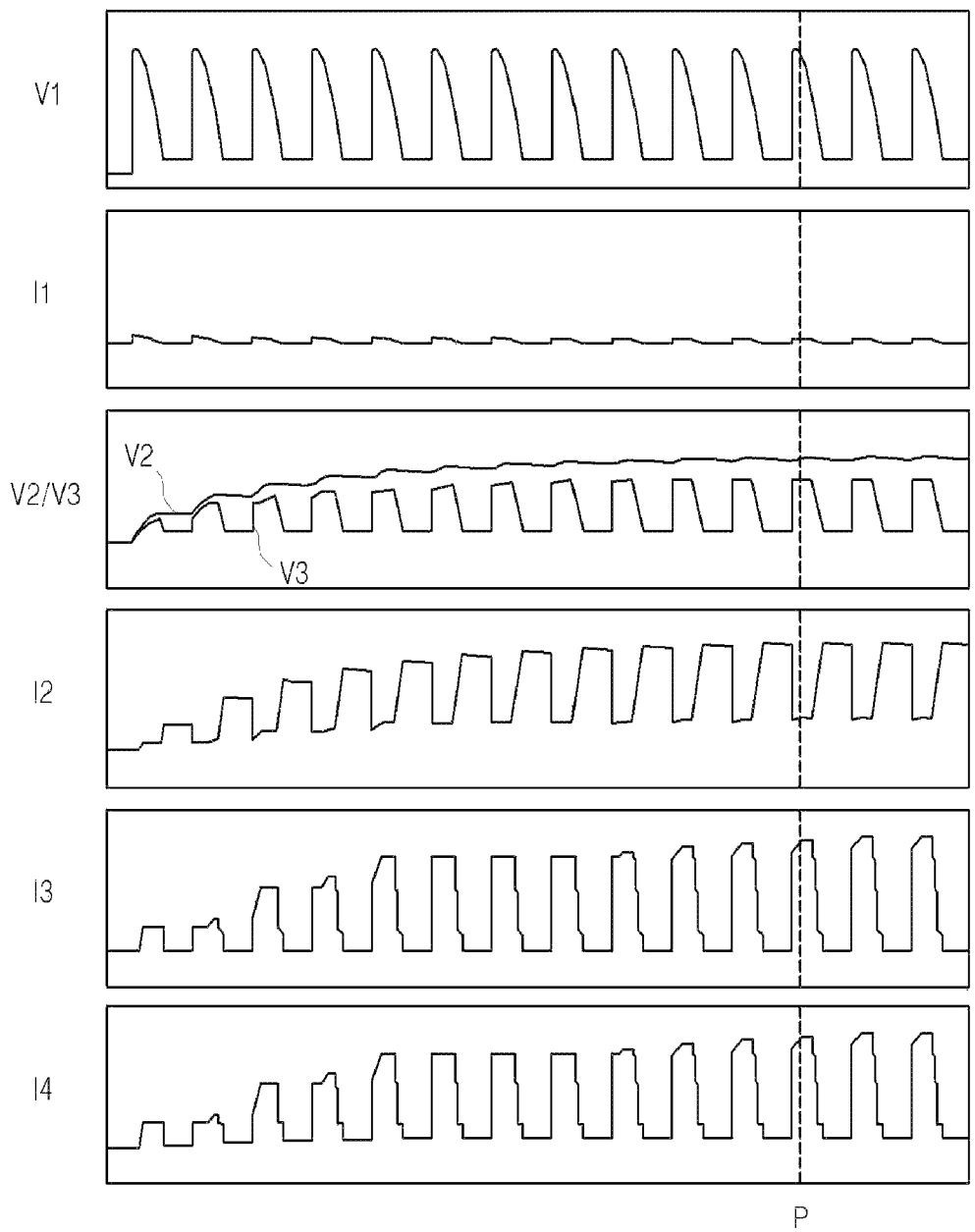
FIG. 13 illustrates waveforms according to the embodiment of FIG. 10 corresponding to rectified voltages having controlled phases.

FIG. 13 illustrates waveforms when a rectified voltage having a phase controlled in a half angle level is supplied by the power circuit 10.

In FIG. 13, a level of the charging voltage V2 in the stable state is lowered compared to the rectified voltage having a phase controlled so that it has a full angle in FIG. 11. Furthermore, the charging voltage V2 is increased relatively gently in the transient state. Accordingly, a point P at which a state switches from the transient state to the stable state may be late compared to FIG. 11. The operation of the embodiment of FIG. 13 corresponding to the transient state and the stable state is the same as that of FIG. 11, and thus a redundant description thereof is omitted.

If the phase of a rectified voltage is controlled in a half angle level or less, the NPN bipolar transistor Qc may not bypass a current by which the light source 12 may have sufficient luminosity although a level of the charging voltage V2 is in the stable state. In this case, the NPN bipolar transistor Qc may continue to perform current control in the stable state as well as in the transient state.

In the lighting system of FIG. 10, as described with reference to FIGS. 11 to 13, a current supplied to the light source 12 can be controlled through the charging voltage of the charging circuit 30 so that it is stabilized in accordance with the transient state. Accordingly, an effect in which shimmer is improved by the same operation as a dimming operation can be expected.

In an embodiment of the present invention, a drop in the collector-emitter voltage of the NPN bipolar transistor Qc can be reduced in accordance with the operation of the dimmer whose phase has been controlled close to a full angle. Accordingly, a dimming characteristic and energy efficiency can be improved. To this end, an embodiment of the present invention may be implemented as in FIG. 14. A filter 18 of FIG. 14 may further include a charging voltage bypass circuit 34.

Figure 14:
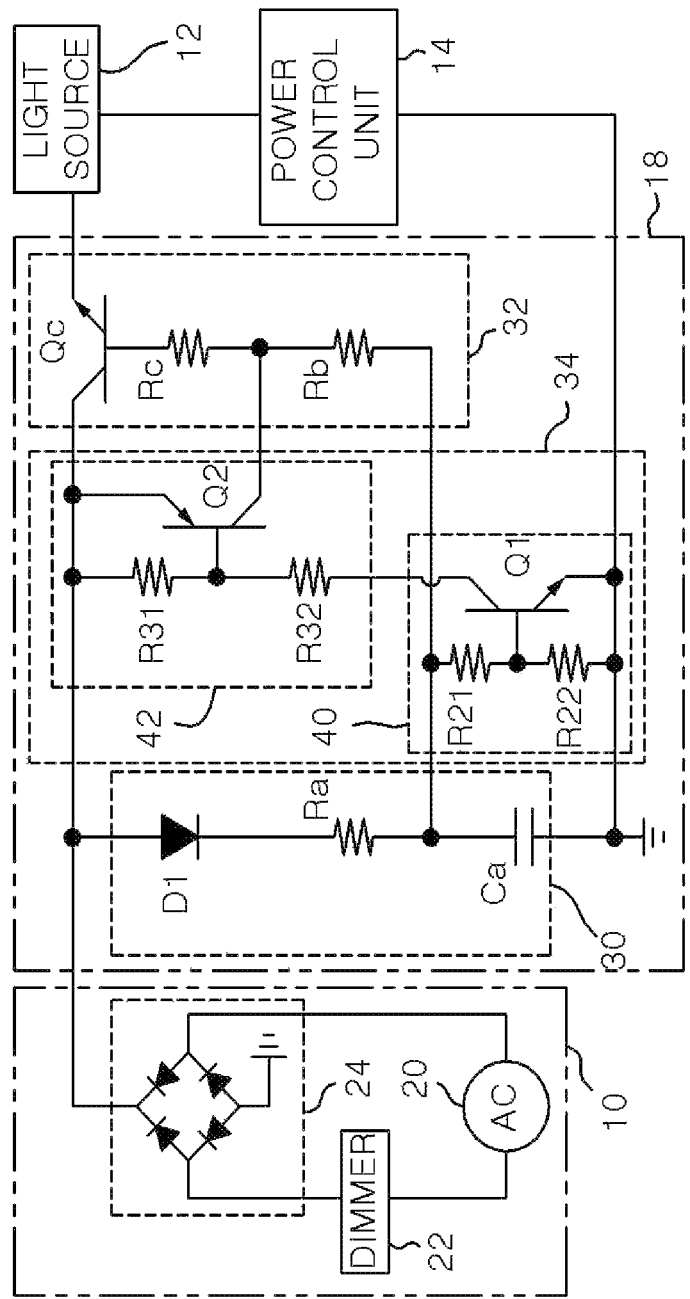
FIG. 14 is a circuit diagram of a lighting system according to yet another embodiment of the present invention.

FIG. 14 discloses a lighting system further including the charging voltage bypass circuit 34 in the filter 18 compared to the lighting system of FIG. 10. Furthermore, in FIG. 14, the power circuit 10, the light source 12, the power control unit 14, the charging circuit 30, and the current control circuit 32 are the same as those of FIG. 10, and thus redundant descriptions thereof are omitted.

The charging voltage bypass circuit 34 may control the PNP bipolar transistor Q2 so that it performs an operation for bypassing the charging circuit 30 in response to a rectified voltage V11 of a high level whose phase has been controlled close to a full angle.

To this end, the charging voltage bypass circuit 34 may include a charging voltage detection circuit 40 and a bypass control circuit 42.

The charging voltage detection circuit 40 may include resistors R21 and R22 and an NPN bipolar transistor Q1. The resistors R21 and R22 are connected in series and are also connected in parallel to the capacitor Ca. Furthermore, the NPN bipolar transistor Q1 may be configured to have a base connected to a node between the resistors R21 and R22 and to control a current path between the bypass control circuit 42 and the ground.

Furthermore, the bypass control circuit 42 may include resistors R31 and R32 and a PNP bipolar transistor Q2. The resistor R31 is connected in parallel to the diode D1 of the charging circuit 30. The resistors R31 and R32 are connected in series. The resistor R32 is connected to the collector of the NPN bipolar transistor Q1. Furthermore, the PNP bipolar transistor Q2 may be configured to have a base connected to a node between the resistors R31 and R32 and to provide a current to the base of the NPN bipolar transistor Qc of the current control circuit 32.

Figure 15:
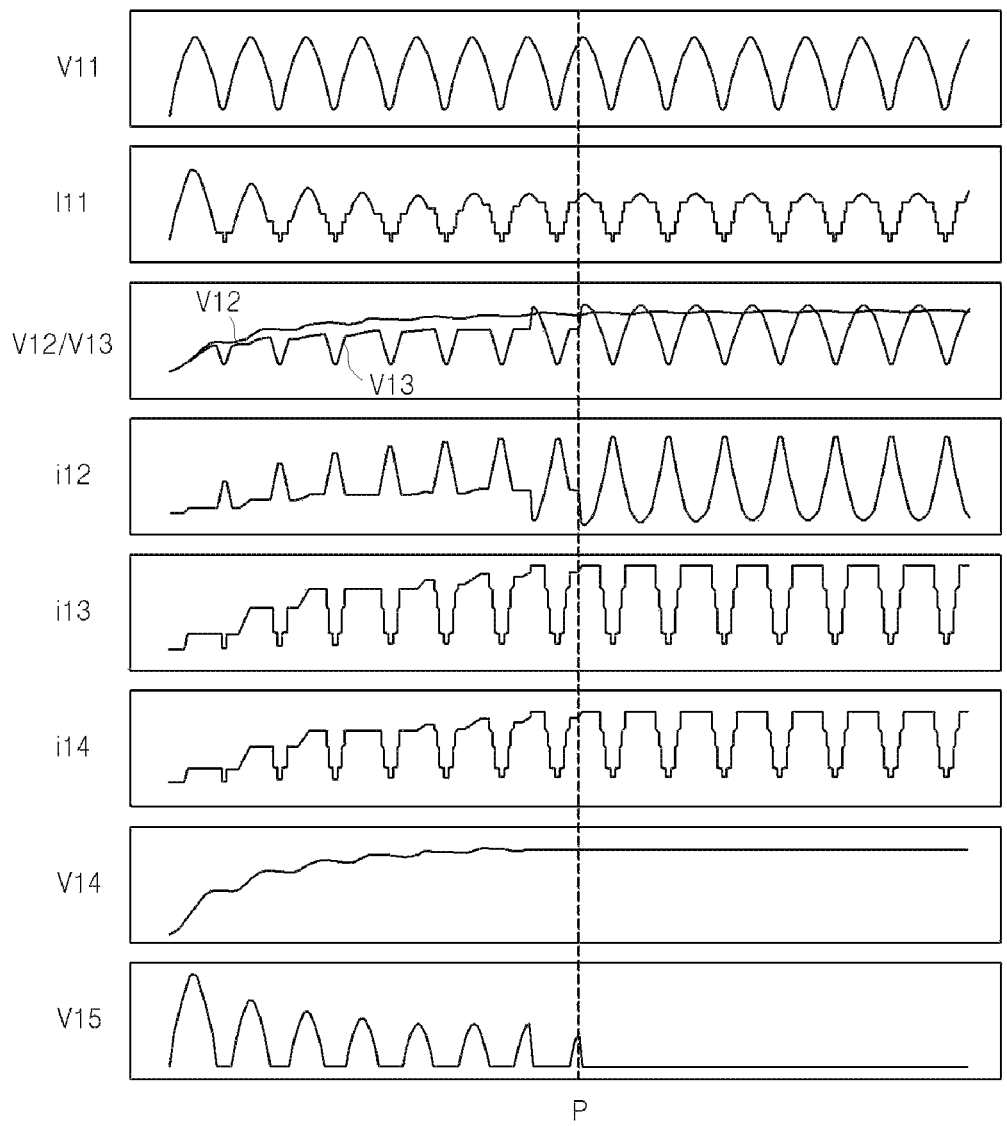
FIG. 15 illustrates waveforms according to the embodiment of FIG. 14 corresponding to rectified voltages of a full angle.
Figure 16:
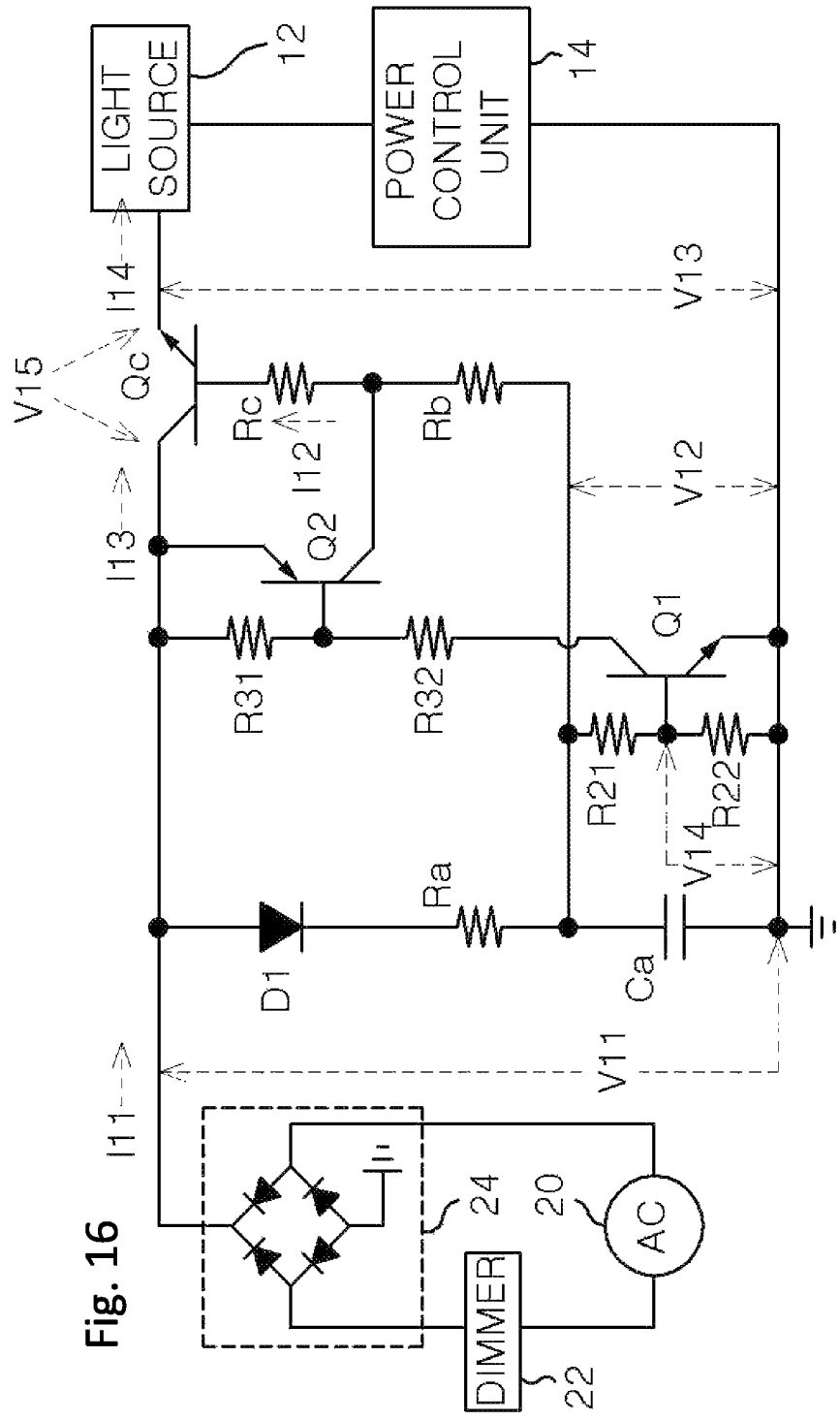
FIG. 16 is a circuit diagram according to the embodiment of FIG. 14 for illustrating the waveforms of FIG. 15.

An embodiment of the present invention including the configuration of FIG. 14 may be understood with reference to FIGS. 15 and 16.

That is, the base of the NPN bipolar transistor Q1 may be supplied with a charging voltage V12 divided by the resistors R21 and R22. In this case, a level of the charging voltage V12 applied the base of the NPN bipolar transistor Q1 may be determined by a resistance ratio of the resistors R21 and R22.

In the transient state, the charging voltage V12 gradually increases in a range of a level that is insufficient for the NPN bipolar transistor Qc to perform a bypass operation.

As the charging voltage V12 increases, a voltage V14 applied to the base of the NPN bipolar transistor Q1 also gradually increases. While the charging voltage V12 is applied to the base of the NPN bipolar transistor Qc, a current starts to flow in the NPN bipolar transistor Q1 due to a voltage V14 that gradually increases. When a current according to the driving of the NPN bipolar transistor Q1 reaches a level capable of driving the PNP bipolar transistor Q2, the PNP bipolar transistor Q2 is turned on.

As a result, while the NPN bipolar transistor Qc is turned on by the charging voltage V12, it can be driven by a current I12 provided to the base of the transistor Qc with a level higher than the charging voltage V12 due to the driving of the PNP bipolar transistor Q2.

Accordingly, the charging voltage bypass circuit 34 of FIG. 14 may control the NPN bipolar transistor Qc so that it supplies a current greater than a current that may be provided by the charging voltage V12.

In the lighting system of FIG. 14, a voltage having a higher level than the charging voltage V12 is supplied to the base of the transistor Qc by the driving of the transistor Q2 with respect to a high input rectified voltage having a phase controlled close to a full angle. Accordingly, a phenomenon in which a rectified voltage drops due to the collector-emitter voltage of the NPN bipolar transistor Qc can be reduced.

Accordingly, the lighting system of FIG. 14 can expect an effect in which shimmer is improved by the same operation as a dimming operation like the lighting system of FIG. 10 and can improve energy efficiency because a voltage drop is reduced when the NPN bipolar transistor Qc operates with respect to a high input rectified voltage.

Accordingly, in accordance with an embodiment of the present invention, the dimming function using the dimmer can be implemented in accordance with a nonlinear load, and shimmer attributable to an irregular output voltage of a dimmer can be solved.

Furthermore, in accordance with an embodiment of the present invention, a production cost required to construct a circuit for solving shimmer can be reduced, and improved electrical efficiency can be obtained.

While various embodiments have been described above, it will be understood to those skilled in the art that the embodiments described are by way of example only. Accordingly, the disclosure described herein should not be limited based on the described embodiments.

What is claimed is:

1. A lighting system, comprising:
a light source supplied with a rectified voltage obtained by controlling a phase of AC power using a dimmer;
a power control unit configured to provide a current path for light emission of the light source in accordance with a state of the rectified voltage; and
a current controller configured to perform charging or discharging in response to an amount of current on the current path that is changed by characteristics of the dimmer and to control an amount of current for the light emission of the light source which flows in the current path in accordance with the charging or discharging,
wherein the current controller equalizes the amount of current flowing in the current path by performing the charging and discharging in a half cycle unit of the AC power.

2. The lighting system of claim 1, wherein:
the light source comprises two or more LED channels connected in series, and
the power control unit performs current regulation corresponding to the light emission of the light source and provides the current path to any one of the two or more LED channels.

3. The lighting system of claim 1, wherein:
a time constant for the charging of the current controller is two times or more of a cycle of the AC power, and
the amount of current flowing in the current path is controlled based on the time constant.

4. The lighting system of claim 1, wherein the current controller comprises:
a current buffer circuit connected to the current path and configured to perform the charging and the discharging, has a time constant corresponding to a cycle that is two times or more of the AC power, and provides a charging voltage changed based on the time constant; and
a current control circuit included in the current path and configured to control a flow of the current in the current path in response to the charging voltage of the current buffer circuit.

5. The lighting system of claim 4, wherein the current buffer circuit comprises:

a capacitor configured to perform the charging and the discharging and provide the charging voltage;

a first resistor connected between the current path and the capacitor and configured to provide a charging path for the capacitor; and a second resistor configured to transfer the charging voltage of the capacitor to the current control circuit, wherein the time constant is determined by the capacitor, the first resistor, and the second resistor.

6. The lighting system of claim 4, wherein:

the current control circuit comprises first and second transistors commonly connected to the current path and combined in a Darlington structure, and the charging voltage is supplied to a base of the first transistor, a current provided by the first transistor is supplied to a base of the second transistor, and the amount of current flowing in the current path is controlled by an operation of the second transistor.

7. A control circuit for a lighting system, comprising:

a current buffer circuit connected to a current path for light emission of a light source which uses a rectified voltage obtained by controlling a phase of AC power using a dimmer and configured to perform charging or discharging in response to an amount of current in the current path which is changed by characteristics of the dimmer and to supply a charging voltage; and a current control circuit configured to control an amount of current for the light emission of the light source which flows in the current path in response to the charging voltage of the current buffer circuit, wherein the current control circuit equalizes the amount of current flowing in the current path by performing the charging and discharging in a half cycle unit of the AC power.

8. The control circuit of claim 7, wherein:

the current buffer circuit has a time constant that is two times or more of a cycle of AC power for the discharging, and the amount of current flowing in the current path is equalized based on the time constant.

9. The control circuit of claim 7, wherein:

the current control circuit comprises first and second transistors commonly connected to the current path and combined in a Darlington structure, and the charging voltage is supplied to a base of the first transistor, a current provided by the first transistor is supplied to a base of the second transistor, and the amount of current flowing in the current path is controlled by an operation of the second transistor.

10. A control circuit for a lighting system, comprising:

a filter configured to transfer power obtained by controlling a phase of AC power using a dimmer for light emission of a light source, wherein the filter comprises:

a charging circuit configured to perform charging corresponding to the power and supply a charging voltage; and a current control circuit configured to control an amount of current which flows in a current path for the light emission of the light source using the power in response to the charging voltage, wherein the current control circuit equalizes the amount of current flowing in the current path by performing the charging and discharging in a half cycle unit of the AC power.

11. The control circuit of claim 10, wherein the charging circuit comprises:

a capacitor configured to charge a rectified voltage transferred through a resistor; and a diode configured to prevent a charging voltage of the capacitor from being discharged in a direction opposite a direction in which the rectified voltage is provided.

12. The control circuit of claim 10, wherein:

the charging circuit comprises a first resistor configured to transfer the rectified voltage of the power for the charging and a second resistor configured to transfer the charging voltage to the current control circuit, and a resistance value of the first resistor is equal to or greater than a resistance value of the second resistor.

13. The control circuit of claim 10, wherein if the charging voltage is a voltage of a predetermined first level or more, a voltage higher than the charging voltage is generated from the rectified voltage so that the voltage of a predetermined first level or more has priority over the charging voltage and supplied to the current control circuit.

\* \* \* \* \*